3,015,662
BENZOPIPERIDINOALKYLIMIDES
Kurt J. Rorig, Glenview, Ill., assignor to G. D. Searle & Co., Chicago, Ill., a corporation of Delaware
No Drawing. Filed Dec. 28, 1959, Ser. No. 862,086
8 Claims. (Cl. 260—287)

This invention relates to benzopiperidinoalkylimides and processes for the manufacture thereof. More particularly, this invention relates to chemical compounds of the formula

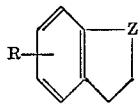

wherein R represents hydrogen or an alkoxy radical, and Z represents a radical of the formula

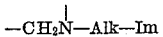

in which Alk represents an alkylene radical and Im represents an imido radical. It follows from the above that both tetrahydroquinolines

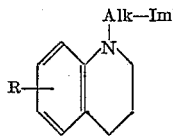

and tetrahydroisoquinolines

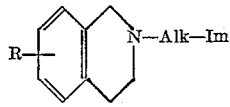

are contemplated herein, these congeneric substances alike being adapted to the purposes of the invention set forth.

Among the alkoxy radicals represented by R in the foregoing formulas, especially lower alkoxy radicals are preferred, which is to say radicals of the formula lower alkyl—O— the lower alkyl constituent being such as methyl, ethyl, propyl, isopropyl, butyl, sec-butyl, tert-butyl, pentyl, isopentyl, neopentyl, hexyl, isohexyl, heptyl, octyl, and homologous $C_nH_{2n+1}$ groupings wherein $n$ is a positive integer amounting to less than 9.

The alkylene radicals represented by Alk in the formulas also are desirably of lower order, for example, methylene, ethylene, trimethylene, propylene, tetramethylene, 2,2-dimethyl-1,3-propylene, and homologous bivalent saturated acyclic straight- or branched-chain hydrocarbon groupings of empirical formula —$C_nH_{2n}$— wherein $n$ is a small positive integer.

As to the imido radicals represented by Im in the formulas, these are optimally cyclic imido radicals

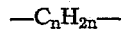

wherein T represents an alkylene, alkenylene, or ortho-divalent monocarbocyclic radical consisting of 6 annular carbon atoms to which more than 3 and fewer than 11 hydrogen atoms are attached. Illustrative of such radicals but not limiting thereto are succinimido, glutarimido, β-ethyl-β-methylglutarimido, maleimido, cyclohexane-1,2-dicarboximido, 1 - cyclohexene-4,5-dicarboximido, 2,6-cyclohexadiene-1,2-dicarboximido, phthalimido, etc.

The compounds to which this invention relates are useful because of their valuable pharmacological properties. Not only are they capable of inhibiting the hyperemia and swelling characteristic of the inflammatory response to tissue injury but, additionally, they are CNS(central nervous system)-affectant and anti-fungal agents.

Manufacture of the imidomethyl compounds of this invention proceeds by heating an appropriate tetrahydroquinoline or tetrahydroisoquinoline of the formula

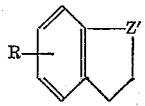

wherein R is defined as above and Z' represents a methyleneamine radical

—$CH_2NH$— with formalin and a selected imide of the formula

ImH

Im being defined as above and H being attached to nitrogen as in

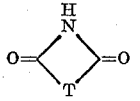

using an alcoholic solvent as the reaction medium. Synthesis is ordinarily completed in as little as half an hour where boiling ethanol is the medium of choice.

The imidoalkyl compounds hereof wherein the alkylene bridge represented by Alk in the foregoing formulas comprises more than 1 carbon atom are obtained by substituting a selected haloalkylimide Im-Alk'-Hal Im being defined as before, Alk' standing for lower alkylene exclusive of methylene and attached to nitrogen, and Hal representing chlorine or bromine, and a base such as trimethylamine, potassium carbonate, or sodium hydroxide for the imide, formalin, and alcohol called for in the aforesaid manufacture of imidomethyl products. A ketonic solvent such as butanone is employed if the base is a solid.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

*1,2,3,4-tetrahydro-2-succinimidomethylisoquinoline*

To a solution of 11 parts of succinimide in 120 parts of absolute ethanol is added 30 parts of 36% formalin and 13 parts of 1,2,3,4-tetrahydroisoquinoline. The resultant mixture is heated at approximately 90° for 2 hours. Upon cooling to 0°, a crystalline precipitate is thrown down. Filtered off and dried in air, the precipitate, which is in the form of white needles, melts at 121–123°. The product thus isolated is 1,2,3,4-tetrahydra-2-succinimidomethylisoquinoline. It has the formula

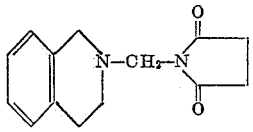

EXAMPLE 2

(A) *N-(5-bromopentyl)succinimide.*—To a solution of 20 parts of succinimide in 160 parts of absolute ethanol is added a solution of 5 parts of sodium in 110 parts of absolute ethanol. Solvent is removed by vacuum distillation, whereupon 159 parts of 1,5-dibromopentane is added to the solid residue. The resultant mixture is heated at 135–145° under reflux overnight, then cooled to room temperature and filtered. The filtrate is distilled in vacuo to remove excess dibromopentane. The residue, a viscous oil, is extracted with a mixture of heptanes boiling in the range 77–115°. Solvent is stripped from the extract by distillation, leaving as a residue the desired N-(5-bromopentyl)succinimide.

(B) *1,2,3,4-tetrahydro-2-(5-succinimidopentyl)-isoquinoline.*—A mixture of 13 parts of 1,2,3,4-tetrahydroisoquinoline, 25 parts of N-(5-bromopentyl)succinimide, 14 parts of anhydrous powdered potassium carbonate, and 100 parts of butanone is heated at the boiling point of the solvent under reflux with agitation for 24 hours. Insoluble matter is then removed by filtration, following which solvent is evaporated at 90–100° C., leaving a brown oil. The oil is taken up in dilute hydrochloric acid, and the acid solution is then washed with ether to remove neutral material. Alkalization with aqueous 25% sodium hydroxide affords a mixture which is extracted with ether. Upon evaporation of solvent from the ether extract, the desired 1,2,3,4-tetrahydro - 2 - (5-succinimidopentyl)-isoquinoline is obtained as the residue. The product has the formula

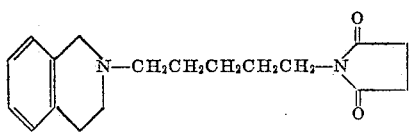

EXAMPLE 3

*1,2,3,4-tetrahydro-2-phthalimidomethylisoquinoline*

To a solution of 16 parts of phthalimide and 140 parts of absolute ethanol is added 30 parts of 36% formalin and 13 parts of 1,2,3,4-tetrahydroisoquinoline. The resultant mixture is heated at approximately 90° for 2 hours. Upon cooling to 0°, an ivory-colored crystalline precipitate is thrown down. Separated by filtration and dried in air, the precipitated material is found to melt at 130–132°. This material is 1,2,3,4-tetrahydro-2-phthalimidomethylisoquinoline, of the formula

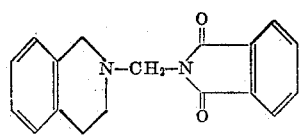

EXAMPLE 4

*1,2,3,4-tetrahydro-1-phthalimidomethylquinoline*

Substitution of 13 parts of 1,2,3,4-tetrahydroquinoline for the 13 parts of 1,2,3,4-tetrahydroisoquinoline called for in Example 3 affords, by the procedure there detailed, 1,2,3,4-tetrahydro-1-phthalimidomethylquinoline as pale-yellow flakes melting at 120–121.5°. The product has the formula

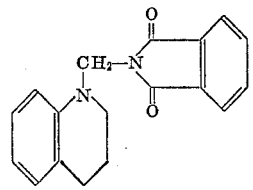

EXAMPLE 5

*1,2,3,4-tetrahydro-6-methoxy-1-phthalimidomethylquinoline*

To a solution of 5 parts of phthalimide in 50 parts of absolute ethanol is added 10 parts of 36% formalin and 5 parts of 1,2,3,4-tetrahydro-6-methoxy-quinoline. The resultant mixture is heated at approximately 90° for ¾ hour, then cooled to 0°. Precipitation occurs. The precipitate, filtered off and dried in air, consists of orange fluffy needles of 1,2,3,4-tetrahydro-6-methoxy-1-phthalimidomethylquinoline melting at approximately 150.5–151.5°. The product has the formula

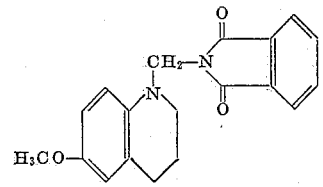

EXAMPLE 6

*8-ethoxy-1,2,3,4-tetrahydro-1-phthalimidomethylquinoline*

Substitution of 5.5 parts of 8-ethoxy-1,2,3,4-tetrahydroquinoline [preparable as described in Ber., 14, 2571] for the 5 parts of 1,2,3,4-tetrahydro-6-methoxyquinoline called for in Example 5 affords, by the procedure there detailed, 8-ethoxy-1,2,3,4-tetrahydro-1-phthalimidomethylquinoline, of the formula

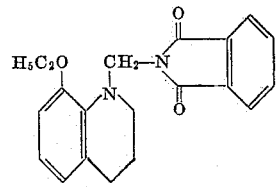

What is claimed is:
1. A compound of the formula

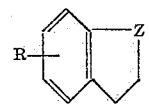

wherein R represents a member of the class consisting of hydrogen and lower alkoxy radicals, and Z represents a radical of the formula

in which Alk represents a lower alkylene radical and X represents a member of the class consisting of succinimido and phthalimido radicals.

2. A compound of the formula

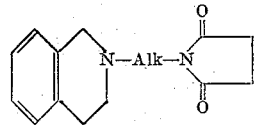

wherein Alk represents a lower alkylene radical.

3. 1,2,3,4-tetrahydro-2-succinimidomethylisoquinoline.

4. A compound of the formula
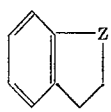
wherein Z represents a radical of the formula
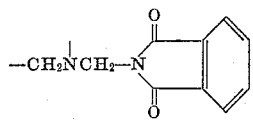
5. 1,2,3,4-tetrahydro-2-phthalimidomethylisoquinoline.
6. 1,2,3,4-tetrahydro-1-phthalimidomethylquinoline.
7. A compound of the formula
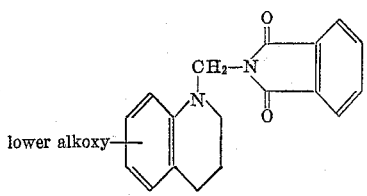
8. 1,2,3,4-tetrahydro-6-methoxy - 1 - phthalimidomethyl-quinoline.
No references cited.